United States Patent
Parasseeri (10) Patent No.: US 12,273,397 B2
(45) Date of Patent: *Apr. 8, 2025

(54) METHODS AND SYSTEMS FOR PROXY RELAY IMPLEMENTATION FOR CLIENT-SERVER CONNECTIONS OVER WIDE AREA NETWORK

(71) Applicant: DISH Network Technologies India Private Limited, Karnataka (IN)

(72) Inventor: Husain Ahamed Parasseeri, Malappuram (IN)

(73) Assignee: DISH Network Technologies India Private Limited (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,767

(22) Filed: Nov. 1, 2022

(65) Prior Publication Data

US 2023/0054029 A1    Feb. 23, 2023

Related U.S. Application Data

(63) Continuation of application No. 17/122,178, filed on Dec. 15, 2020, now Pat. No. 11,516,262.

(51) Int. Cl.
| | |
|---|---|
| *H04L 65/1045* | (2022.01) |
| *H04L 9/40* | (2022.01) |
| *H04L 65/1069* | (2022.01) |
| *H04L 65/61* | (2022.01) |
| *H04L 67/02* | (2022.01) |

(52) U.S. Cl.
CPC ...... *H04L 65/1045* (2022.05); *H04L 63/0236* (2013.01); *H04L 65/1069* (2013.01); *H04L 65/61* (2022.05); *H04L 67/02* (2013.01)

(58) Field of Classification Search
CPC . H04L 65/1045; H04L 65/61; H04L 65/1069; H04L 67/02
See application file for complete search history.

(56) References Cited

U.S. PATENT DOCUMENTS

| | | | |
|---|---|---|---|
| 8,638,356 B2* | 1/2014 | Sunkara | H04L 65/61 |
| | | | 348/14.11 |
| 2003/0112823 A1* | 6/2003 | Collins | H04L 67/104 |
| | | | 370/474 |

(Continued)

*Primary Examiner* — Andrew C Georgandellis
(74) *Attorney, Agent, or Firm* — KW Law, LLP (57) ABSTRACT

Methods and systems for establishing a media streaming connection between a client and a placeshifting device that are each communicating via a network using a standard and nonstandard port, including: in response to an initial denial of a request to receive streamed content by a client via a nonstandard port in communication with the placeshifting device, attempting another request by the client using a standard port in communication with a relay reverse proxy service of a relay backend server to the placeshifting device; establishing a first connection by the client between the relay reverse proxy service of the relay backend server and the client using the standard port to receive streamed content from the placeshifting device; and establishing a second connection between the relay reverse proxy service of the relay backend server and the placeshifting device using the nonstandard port to communicate streamed content streamed directly from the placeshifting device.

6 Claims, 3 Drawing Sheets

(56) References Cited

U.S. PATENT DOCUMENTS

2010/0268832 A1* 10/2010 Lucas .................... H04L 65/60
709/228
2010/0279733 A1* 11/2010 Karsten ................. H04L 69/18
455/552.1

* cited by examiner

METHODS AND SYSTEMS FOR PROXY RELAY IMPLEMENTATION FOR CLIENT-SERVER CONNECTIONS OVER WIDE AREA NETWORK

CROSS-REFERENCE TO RELATED APPLICATIONS

This application claims priority to U.S. patent application Ser. No. 17/122,178 filed on Dec. 15, 2020 and entitled "METHODS AND SYSTEMS FOR PROXY RELAY IMPLEMENTATION FOR CLIENT-SERVER CONNECTIONS OVER WIDE AREA NETWORK," which is incorporated herein by reference.

INTRODUCTION

The present disclosure generally relates to systems, methods, and apparatuses for establishing connections between devices over a wide area network. Such systems and techniques may be useful, for example, in establishing connections between devices that are logically separated from each other by one or more firewalls.

In various embodiments, the techniques and systems described below may be used to establish streaming connections between media players and placeshifting devices that provide media content across the network, although equivalent concepts could be readily applied in any number of other applications and settings. Various embodiments may be used in connection with media players, placeshifting devices, digital video recorder (DVR) devices, video game players, and/or any other devices that interoperate with other devices using a digital network.

Viewers now obtain television and other media content from a wide array of devices and sources. Media streaming is increasingly replacing broadcast television, for example, and time and placeshifting devices are becoming increasingly common in homes, offices, and other settings. The digital video recorder (DVR), for example, allows television viewers to record television programming or other content for viewing at a later time. Place shifting devices allow live and/or pre-recorded programs to be encoded for efficient delivery over local and/or wide area networks for viewing on a phone, tablet, computer, or other device at a remote location from the place that the content is received or stored. Additionally, video game players and other media devices are becoming increasingly commonplace in homes and other settings.

Although modern media systems can provide highly-convenient content for viewers, it is a continual challenge to establish connections between client and server systems operating over the Internet or another wide area network (WAN). In particular, firewalls and other structures can effectively preserve network security. However, these same structures can have the undesired effect of preventing access to desired services. To use placeshifting applications as an example, it may be challenging to establish a connection between a placeshifting device and a media player if a firewall or other security structure resides between the two entities that wish to communicate. In addition to preventing undesired access to the secure network, then, a firewall may prevent legitimate and desired access to placeshifting or other services, particularly if the user incorrectly or incompletely configures the firewall.

Therefore, given the challenges that can frequently arise in effectively establishing connections between clients and servers for place shifting, media streaming, and/or other applications because of firewalls, it is therefore desirable to create devices, systems, and processes to effectively yet securely establish connections between clients and servers on the Internet or other wide area networks.

Other desirable features and characteristics will become apparent from the subsequent detailed description and the appended claims, taken in conjunction with the accompanying drawings and this background section.

BRIEF DESCRIPTION

Various embodiments relate to processes, computing systems, devices, and other aspects of a processing system that provides connectivity between a client, a placeshifting device, and server devices, particularly when the server device is separated from the client device by a firewall or similar barrier to network connectivity.

In at least one exemplary embodiment, a method of establishing a media streaming connection between a client and a placeshifting device that are each communicating via a network using a standard and a nonstandard port is provided. The method includes: in response to an initial denial of a request to receive streamed content by a client via the nonstandard port in communication with the placeshifting device, attempting another request by the client using a standard port in communication with a relay reverse proxy service of a relay backend server to the placeshifting device; establishing a first connection by the client between the relay reverse proxy service of the relay backend server and the client using the standard port to receive streamed content from the placeshifting device; and establishing a second connection between the relay reverse proxy service of the relay backend server and the placeshifting device using the nonstandard port to communicate streamed content streamed directly from the placeshifting device wherein the first connection configured with the standard port is in communication with the second connection configured with the nonstandard port for sending streamed content originating at the placeshifting device to the client.

In at least one exemplary embodiment, the method further includes: enabling receipt of the streamed content by the client via the standard port using the relay reverse proxy service to circumvent causing another denial of the request for streamed content to the placeshifting device via the nonstandard port caused by a firewall coupled in between the client and the placeshifting device that originates the streamed content.

In at least one exemplary embodiment, the method further includes a firewall which is configured to prevent communication of the client to the relay backend server on the nonstandard port.

In at least one exemplary embodiment, the method further includes: configuring the nonstandard port in a 5000 to 5999 port range for a relay instance to connect a playshifting device.

In at least one exemplary embodiment, the method further includes: connecting the standard port of a 443 port range of the client to the relay reverse proxy service wherein the relay proxy service is monitoring requests from the client on the nonstandard port of the 9000 port range.

In at least one exemplary embodiment, the method further includes: connecting by the client to the reverse relay proxy service to a relay instance operating on a same node over a port range of 5000 to 5750 as the relay instance is operating to connect to a playshifting device.

In at least one exemplary embodiment, the method further includes: configuring the reverse relay proxy service to act as an endpoint for an HTTPS handshake with the client over the standard port to enable streamed content that originated at the placeshifting device for receipt by the client.

In at least one exemplary embodiment, a method of establishing a connection via a relay server between a client and a placeshifting device that are each communicating via a network is provided. The method includes: first attempting to establish a streaming session across the network between the client device and the placeshifting device on a nonstandard port range, if the streaming session attempt on the nonstandard port range is unsuccessful, directing the client and the placeshifting device to contact the relay server via the network, wherein the server is directed by a relay manager via a standard port range connection over the network; in response to the client and the placeshifting subsequently contacting the relay server, establishing a first connection using a standard port range between the relay server and the client and a second connection using a nonstandard port range between the relay server and the placeshifting device using; and relaying data received by the relay server on each of the first and second connections to the other of the first and second connections to thereby establish the connection between the client and the placeshifting device via the relay server.

In at least one exemplary embodiment, the method further includes: wherein the first connection is established between a relay reverse proxy and the client using a standard port range.

In at least one exemplary embodiment, the method further includes: wherein the second connection is established between a relay reverse proxy service and the placeshifting device using a nonstandard port range.

In at least one exemplary embodiment, the method further includes: enabling receipt of the streamed content by the client via the standard port range using the relay reverse proxy service to circumvent causing a denial of another request for streamed content to the placeshifting device via the nonstandard port range caused by a firewall coupled in between the client and the placeshifting device that originates the streamed content.

In at least one exemplary embodiment, the method further includes: wherein the firewall is configured to prevent communication of the client to the relay backend server on a nonstandard port.

In at least one exemplary embodiment, the method further includes: configuring a nonstandard port in a 5000 to 5999 port range for a relay instance to connect to a playshifting device.

In at least one exemplary embodiment, the method further includes: connecting a standard port of a 443 port range of the client to the relay reverse proxy service wherein the relay reverse proxy service is monitoring requests from the client on the nonstandard port of the 9000 port range.

In at least one exemplary embodiment, the method further includes: connecting by the client to the reverse relay proxy service to the relay instance operating on a same node over a port range of 5000 to 5750 as the relay instance is operating to connect to the playshifting device.

In at least one exemplary embodiment, the method further includes: configuring the reverse relay proxy service to act as an endpoint for an HTTPS handshake with the client over the standard port to enable streamed content that originated at the placeshifting device for receipt by the client.

In at least one exemplary embodiment, a system for establishing a media streaming connection between a client and a placeshifting device that are each communicating via a network is provided. The system includes: a relay manager module configured to receive a request to establish the media streaming connection between the client and the placeshifting device; a relay reverse proxy module configured to establish, in response to the request, a first connection between the client and the relay manager module; and a relay instance module configured to establish, in response to the request, a second connection between the relay manager module and the placeshifting device, to relay data received on each of the first and second connections to the other of the first and second connections to thereby establishing the media streaming connection between the client and the placeshifting device.

In at least one exemplary embodiment, the system further includes: a standard port of a 443 port range for the first connection of the client to the relay reverse proxy module.

In at least one exemplary embodiment, the system further includes: a nonstandard port in a 5000 to 5999 port range for a relay instance to connect to the playshifting device.

In at least one exemplary embodiment, the system further includes: a nonstandard port of the 9000 port range enables the reverse relay proxy module to monitor a client's requests.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, a relay server can establish separate connections with a client and a receiver to effectively bridge communications between the two devices when a direct connection via a web server is not available. A relay server could establish separate connections with receiver such as a hopper receiver that contains a media player and with a placeshifting device, for example, and could Subsequently relay data between the two connections as needed.

Further, although the two connections established between the relay server and either or both of the client and receiver could be implemented using any protocols or techniques, in some implementations the connections are reliable connections (e.g., transmission control protocol (TCP) connections) that can be originated from behind the firewall. By providing a relay server that is able to relay information between two separate connections to the client and receiver, users are provided with a very dependable mechanism for easily establishing client-receiver connections. Moreover, much of the information needed to configure Such a connection can be readily automated in many implementations, thereby dramatically improving the likelihood of Successful connections between clients and receiver while simultaneously reducing the complexity (and therefore the frustration) associated with configuring such connections.

In various embodiments, a client device attempts to locate and contact a receiver device that resides behind a firewall or similar logical barrier to establish a connection via network. The receiver device may provide video streams to the client, such as time and/or place shifted video, video on demand and/or the like.

A port number is a virtual numbered address that's used as a communication endpoint by transport layer protocols like UDP (user diagram protocol) or TCP (transmission control protocol). Network ports direct traffic to the right places—i.e., they help the devices involved identify which service is being requested. For instance, the port that's responsible for handling all unencrypted HTTP web traffic is port 80. When we use a TLS certificate, the communication channel between the browser and the server gets encrypted to protect all sensitive data exchanges.

All such secure transfers are done using port 443, the standard port for HTTPS traffic. However, HTTPS port 443 also supports sites to be available over HTTP connections. If the site uses HTTPS but is unavailable over port 443 for any reason, port 80 will step in to load the HTTPS-enabled website. This port is used for secure web browser communication. Data transferred across such connections are highly resistant to eavesdropping and interception. Moreover, the identity of the remotely connected server can be verified with significant confidence. Web servers offering to accept and establish secure connections listen on this port for connections from web browsers desiring strong communication security. Once established, web browsers inform their users of these secured connections by displaying an icon—a padlock, an unbroken key, etc.—in the status region of their window.

In an exemplary embodiment, the present disclosure describes a client that can be paired with a server and receiver using network transport security (TLS). The TLS can be negotiated over port 80 or port 443. Either port 80 or port 443 can be used in combination with a TLS reverse proxy for the handshake. In reverse proxy caching is when a Traffic Server acts as a proxy cache on behalf of the origin servers that store the content. The Traffic Server is configured to behave outwardly as an originating server that the client is trying to connect to. The advertised hostname of the origin server resolves to Traffic Server, which serves client requests directly, fetching content from the true origin server when necessary.

In an exemplary embodiment, the present disclosure describes an implementation that may be applied to legacy systems that have been configured as a default to negotiate TLS handshake over port 443 or configured to negotiate the TLS handshake in a non-default over port 80. That is, the client us configured with a browser is implemented for the browsers to act on the initial assumption that port 443 will be used first for an attempted connection, then the port 80 will be tried.

In an exemplary embodiment, the present disclosure describes a network that can be implemented using a UDP-cast is a file transfer tool that can send data simultaneously to many destinations on a LAN. The UDP protocol operates on the UDP port 9000.

The routers, gateways, or other devices can be configured to provide logical firewalls that can prevent direct incoming connections from network. This is for security purposes to prevent unauthorized access to personal networks (e.g., LAN) from the outside Internet or another WAN. With certain or normal router configuration, however, devices operating on the internal network are usually allowed to send outgoing messages to the network. A web server can therefore initiate outgoing connectivity with relay service on network when it starts up, or at any other time. This outgoing connection can initiate the establishment and maintenance of a connection that persists over time, as desired. The connection may be maintained using, for example, as a TCP keepalive packet or the like.

For example, in one example, a messaging service can be configured to maintain persistent connections with multiple devices is described in U.S. Pat. No. 9,015,225, which is incorporated herein by reference, although other embodiments could use different services or mechanisms as desired. In this case, client devices are configured to contact the messaging service to request new connections from particular servers 104 that is in communication with the desired server. Often, clients are "hard coded" or otherwise provided with a preexisting address (e.g., a URL or other identity) of a message service on the WAN that can relay a message to the desired server via a previously-established connection between the message service and the server. This allows the server to make an outgoing connection to the network through a firewall if indeed the server can locate and communicate with the client device that is requesting the connection.

Often, however, the server is unable to contact the client device due to network address translation issues relating to the client address, due to client-side firewalls blocking direct connections to the client, and/or due to other issues. Network-based relay services have seen some success, but it is nevertheless desirable to allow client devices and server devices to establish direct connections whenever possible. Direct connections do not typically require an intermediary computer, so the cost of providing such services can be reduced (or even eliminated). As for the connection itself, the processing and transmission delays inherent in any intermediating relay service are eliminated, thereby allowing for more efficient communication between the client and server.

Direct connections may be more bandwidth efficient as well. One example of a relay service is described in U.S. Pat. No. 8,171,148, which is incorporated herein by reference, although other embodiments may consider other relay services, as desired.

In an exemplary embodiment, to establish a direct connection over a network, then, the client device and the server device typically need to (1) overcome any firewalls or other logical barriers that may impede direct communications; and (2) identify each other on the network using appropriate port numbers and addresses. With regard to the first issue, a message service or the like can be used to transmit messages to the desired server via the persistent connection previously established between the server and service. To overcome the second issue, client devices need to discover their port number and address information and forward it for storage on a data storage server on the network. When the server later attempts to contact the client device, the server can retrieve the previously-stored port and address information from the server. Equivalently, the message service (or another service with access to the network) could obtain the relevant port number and address information on behalf of the server, as appropriate.

In an exemplary embodiment, port and address information for the client may vary from embodiment to embodiment. The client may initially determine its IP (or similar) address and port number on its local area network, for example, as well as its IP address and port number used on the external interface of router for communication on WAN. The client may determine additional addresses used by any intervening devices or networks, as desired.

Figure 1:
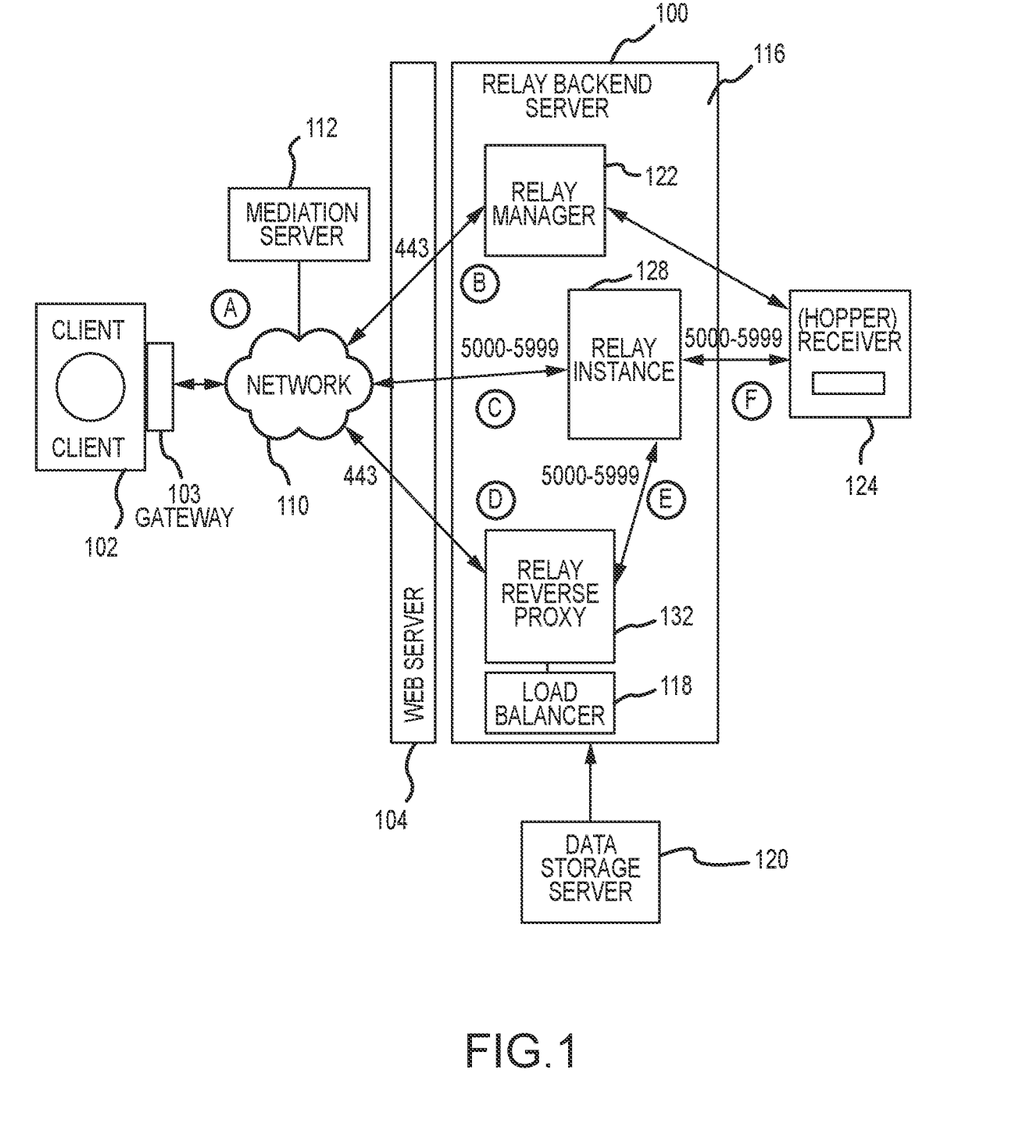
FIG. 1 is a block diagram of an exemplary system for establishing and Supporting relay connections between a client node and a server node.

FIG. 1 shows an example of a system 100 in which a client 102 attempts to contact a receiver (e.g. hopper receiver or the like) 104 via a wide area network no. With reference to FIG. 1, establishing a connection between a client 102 and a web server 104 over a network 110 suitably includes a relay backend system 116 that relays data between two connections separately established with client 102 and web server (or server) 104. System 100, therefore, allows client 102 and web server 104 to communicate to the receiver device 124 using relay backend system 116 even though a firewall would otherwise prevent direct communications between client 102 and the receiver 124, as described more fully below.

In an exemplary embodiment, the client 102 attempts to connect via the network 110 to the receiver 124 on a nonstandard port (non-443 port) other than via connections B and D. Therefore, because of the blocking over the nonstandard (non-443) port by a VPN/firewall the request is denied. The relay backend server 116 service uses a port in the range of 5000-5750 to connect to the receiver 124. The nonstandard port range connections are designated "C", "E" and "F". The relay backend server 116 service uses a new relay proxy, the relay reverse proxy 132 (which is a node JS based reverse proxy solution to circumvent the firewall). The relay reverse proxy 132 listens on the nonstandard 9000 port in which the client device 102 attempts to establish a connection to the receiver (hopper) 124 streaming session. The client device 102 makes a first connection and connects to the relay reverse proxy service (connection D) on port 443. The messages are sent to the relay manager 122 on port 443. The receiver uses ports in the range of 5000-5999 to connect to the relay instance 128. The reverse relay proxy act as a "gate" to route traffic from port 443 to the requested service to the relay instance 128 via ports in the range of 5000-5999 (connection path E). The relay instance 128 is connected via connection F on port ranges 5000-5999 to the receiver 124. Hence the relay reverse proxy 132 service redirects to the non-443 port traffic.

The web server 104 establishes a persistent connection by configuring a relay backend server 116 to connect the client device 102 to the receiver 124. The web server 104 accepts requests from the client device 102 on the standard port 443 to the receiver 124. The client device 102 is not able to send requests on a nonstandard port (i.e., the ports in the range of 5000-5999, connection C) because of the firewall. The receiver 124 operates on the ports 5000-5999 via the connection F and operates on the nonstandard ports 5000-5999 to send and receive traffic requests. When the relay manager 122 operating on port 443 (connection B) listens and identifies requests from the client device 102 via connection D on port 443, the relay reverse proxy 132 redirects the traffic on ports 5000-5999 (connection E). In other words, the relay reverse proxy service 132 can relay connection requests from client device 102 that are forwarded by the web server 104 to a relay instance 128. The relay instance 128 acts as a routing module for sending traffic (via connection F) to the receiver 124, as desired. The receiver 124 can respond to the connection request by using the non-443 ports (in this case, ports 5000-5999) on connection F.

In other instances, in an exemplary embodiment, the traffic previously-stored address and port number information of the client device 102 can also be stored in the data storage server 120 in communication with the web server 104 and then using the retrieved address and port number information to establish an outgoing connection to client device 102 to enable traffic to circumvent the firewall as desired.

In still other embodiments, server 104 is a software program, applet, or the like executing on a conventional computing system (e.g., a personal computer). Such embodiments, server 104 may encode, for example, some or all of a screen display typically provided to a user of the computing system for placeshifting to a remote location. One device capable of providing such functionality is the SLNG™ Projector product available from SLING™ Media of Foster City, Calif., which executes on a conventional personal computer, although other products could be used as well. And again, the types of clients 102 and servers 104 used in system 100 are not limited to placeshifting devices; any other client devices 102 and servers 104 that are capable of communicating on network 110 could be equivalently applied.

In other embodiments, server 104 simply provides streaming, file-based, and/or any other sort of information on network 110, including responses to database queries or the like. As noted above, the present features are not limited to placeshifting applications and may be used with any conventional server 104 device or application operating on network 110.

The receiver 124 may be any sort of network device having a processor, memory, and input/output interfaces (e.g., a network interface), such as a streaming video source, a file server, a video game device, a time and/or placeshifting device, and/or the like. An exemplary placeshifting device suitably includes a placeshifting encoder system that receives media content from a content source, encodes the received content into a streaming format, and then transmits the encoded media stream to a media player (receiver 124) over network 110. The media player of the receiver 124 suitably receives the encoded stream, decodes the stream, and presents the decoded content to a viewer on a television or other display. In various embodiments, a web server 104 may also be provided to communicate with the encoder system and/or player via network 110 to assist these devices in locating each other, maintaining security, providing or receiving content or information, and/or any other features as desired. This feature is not required in all embodiments, however, and the concepts described herein may be deployed in any data streaming application or environment, including placeshifting but also any other media or other data streaming situation.

In an exemplary embodiment, one example of a receiver 124 in some implementations could be the AIRTV® Classic device that is available from although http://www.airtv.net, and equivalent embodiments could be used with any number of other DVRs, media receivers/players, video on demand (VOD) servers, set-top boxes, video game consoles, time or place shifting devices and/or the like. U.S. Pat. No. 8,099, 755 provides additional detail about several examples of placeshifting devices and techniques. Equivalent concepts could be implemented in any number of other devices or systems. Many different types of placeshifting devices are generally capable of receiving media content from an external source, such as any sort of digital video recorder (DVR), set-top box (STB), cable or satellite programming source, DVD player, and/or the like. In other embodiments, server 104 may be integrated with any sort of content-receiving or other capabilities.

Although the IP address of the receiver 124 in performance of streaming session may be obtained in any manner, one embodiment could permit the client 102 to execute a TRACEROUTE operation targeting a known service on the network (e.g., the messaging service, a video hosting service, or any other host on the WAN). The resulting information could be forwarded from client 102 to web server 104 as network information for storage in a database, as desired. Again, client 102 may determine its address information and forward the determined information to web server 104 in any manner.

The particular address information gathered by the client and/or server may vary, from embodiment to embodiment, as may the specific address formats and protocols may be used. The examples described herein often refer to Internet Protocol (IP) addresses in the form of x.x.x.x. In practice, any other address formats (e.g., IPv6 or the like) could be equivalently used. Address information could also include port numbers or similar constructs, as appropriate.

In many implementations, mediation server 112 is able to establish UDP or other connectionless sessions with both client 102 and server 104. As a client 102 requests connection to a server 104 that is already in communication with the mediation server, the two parties to the proposed session can often simply exchange UDP (or other) parameters and continue communicating. This technique is often referred to as "UDP hole punching and is often based upon conventional network address translation (NAT) techniques. Such techniques are often unsuccessful, however, particularly when the client 102 and server 104 are separated by a relatively sophisticated firewall 103 (e.g., a firewall associated with many corporate networks) that may recognize that the party originally involved in establishing the UDP session (e.g., the mediation server 112) is no longer the party involved in communications after the client 102 assumes the parameters previously used with server 112. Moreover, UDP or similar sessions may involve some manual configuration by the user, which can be inconvenient and often difficult, particularly to relatively unsophisticated users. When neither direct connection nor UDP-type proxy service is available to the user, it would be desirable to provide an additional connection feature that nevertheless allows the client 102 to communicate with server 104.

In various embodiments, a load balancer 118 may also be provided to allocate relay backend server 116 and/or other resources efficiently and effectively. Load balancer 118 may be implemented using any combination of hardware and/or Software resources, and may be based upon network traffic, processor loads on the relay backend server 116, geographic distribution of clients 102 and/or relay backend server 116, and/or any other factors as appropriate. In various embodiments, each relay backend server 116 is implemented using conventional computer server hardware and software. Each relay backend server 116 may be implemented, for example, with a server computer system that is based upon any processor, architecture and/or operating system. In various embodiments, each relay backend server 116 is an actual or virtual Communications from the server 104 with relay backend server 116 may be initiated in any manner. In various embodiments, server 104 maintains a relatively constant connection with a relay manager 122 at a uniform resource locator (URL) or other network address that can be readily contacted from behind firewall of gateway device 103. The relay manager 122 may simply be a TCP server, for example, that is automatically accessed when server 104 starts up. In such cases, server 104 contacts the relay manager 122 on startup (or on some other temporal basis), establishes a TCP or similar connection, and then awaits further action. This connection may be kept alive using relatively low bandwidth "keep alive" features that are part of the TCP protocol. By pre-establishing the connection from the server 104 to the relay manager 122, a channel is maintained that can be used to send instructions or requests to the client 102 and server 104, even though the client 102 is behind a firewall of gateway device 103. This is because many routers used in firewalls 103 will allow outgoing TCP connections that are originated within the trusted space while disallowing incoming TCP (and other) connections. After establishing a TCP or other connection from the server 104 to relay manager 122, that preexisting connection can be used to transmit an instruction to server 104 to establish a separate connection with the relay backend server 116. This second connection can be established as another outgoing TCP (or other protocol) communication that is not likely to be blocked by firewall of gateway device 103.

Relay manager 122 can transmit an instruction over the preexisting channel that directs server 104 to separately contact the relay backend server 116. This instruction may optionally include information about the client 102 or other party that is requesting the connection, although this information need not be present in all embodiments. When instructed to do so, server 104 suitably establishes a TCP or other connection (i.e., the relay reverse proxy 132 service) with the relay backend server 116 that can be used to transmit data to client 102, as described more fully below.

When the web server 104 has obtained the port number and address information relating to the client 102, the web server 104 suitably establishes outgoing connections to the relevant port numbers and addresses in an attempt to connect to the client device 102. In various embodiments, the web server 104 attempts to BIND or otherwise connect to a known port (in this case ports in the range of 5000-5999) on the destination address that is associated with a particular application. In other embodiments, web server 104 uses network address translation (NAT) or similar techniques to attempt to contact client device 102, as desired. Several examples of network mediation services and techniques are described in U.S. Pat. Nos. 8,149,851; 8,626,879; and 8,799, 485, and in US Patent Publication No. 2011/0196521, all of which are incorporated herein by reference.

The Client device 102 is any device capable of communicating on network no to obtain data or services from the web server 104 and can attempt communication requests using a plethora of web-browsers such as CHROME®, SAFARI®, EDGE®, INTERNET EXPLORER®). In various embodiments, client device 102 is a mobile phone, tablet, computer, and/or the like that interfaces with network 110 via an appropriate router, gateway, or another device. The firewall (of the gateway device 103) may be, for example, a mobile telephony gateway to the broader Internet that includes the firewall. Equivalently, it may be a home or office-type router that connects wired and/or wireless local area networks to WAN, as desired. The gateway device 103 may provide firewall and other network security functions, as desired. Typically, gateway device 103 will assign addresses and/or port numbers on an external interface associated with WAN for each of the client device 102 operating on the internal side of gateway device 103 (e.g., on LAN), as appropriate. The gateway device 103 is a computing device having processing circuitry programmed to carry out the various functions described herein. Typically, the processors of such device execute software or firmware instructions that are stored in a memory, solid-state or magnetic drive, and/or other non-transient storage devices. The gateway device 103 also includes network interface circuitry to communicate via local area networks (LANs), wide area networks (WANs), mobile telephony networks, and/or other communications links that may be available. Such links may be provided via fiber or other wired connections, while other links may be wireless telephony, network and/or other links, as desired.

Network 110 is any wide area network (WAN) such as the Internet, a telephony network, a public or private network of any sort, or the like. Network 110 may be based upon TCP/IP protocols, or any other protocols as desired. Networks 110 may be implemented as wired or wireless LANs, or any equivalent communications links. Such LANs may be built in accordance with IEEE protocols 802.3 and/or 802.11 in some implementations.

Figure 2:
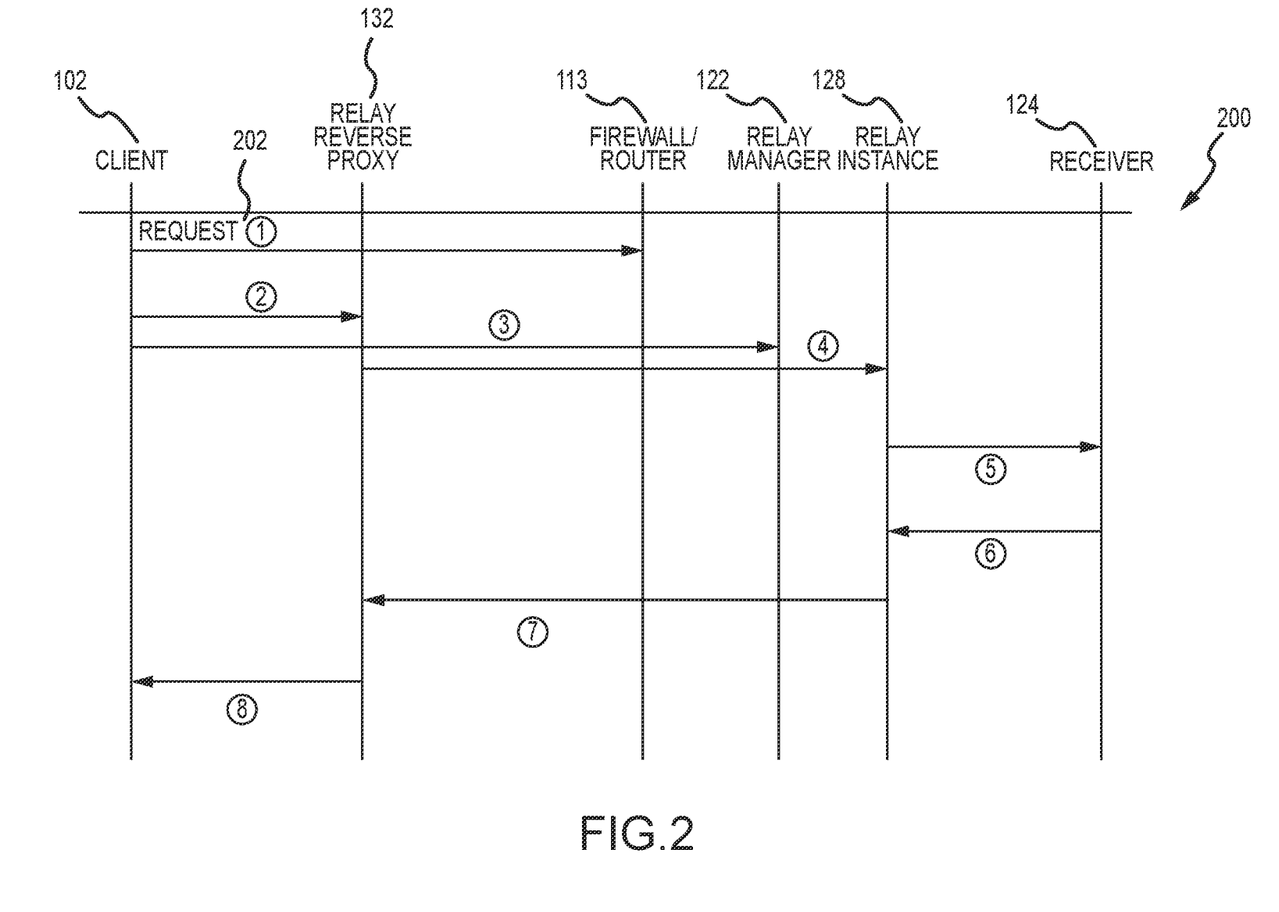
FIG. 2 is a message flow diagram showing an exemplary process for reliably establishing connections between a client and a server.

FIG. 2 illustrates an example process 200 to establish a connection between client device 102 and server device 104, although equivalent embodiments may modify the various functions and messages shown in FIG. 2 in any manner. Generally speaking, the various functions shown in FIG. 2 may be carried out in processing hardware (e.g., one or more microprocessors) residing within the appropriate device, system or service described in FIG. 1. Various embodiments may implement some of the functions (e.g., the functions associated with web server 104) using "cloud" computing resources, such as the AMAZON® Web Services (AWS), MICROSOFT® CLOUD products, or the like. Typically, the various functions are carried out by the processor executing software or firmware logic in any format that is stored in memory or other non-transitory storage prior to execution. Equivalent embodiments may operate in any other manner, as desired.

In an exemplary embodiment, when a request for a relay connection is received from a mediation server 112, client 102, or another requesting party. It is observed by the web server 104 that network 110 is blocking HTTPS traffic to the relay backend service of the relay backend server 116. The relay manager 122 determines that the blocking of HTTPS is because of requests over the nonstandard (non-443) port by the VPN/Firewall 113 of the gateway device 103 (the relay service uses using the ports in the range 5000-5750). The relay reverse proxy 132 listens on the nonstandard 9000 port and to configure a streaming session for the receiver 124 through the reverse proxy. The reverse proxy is configured using an apache mod proxy. In such scenarios, httpd itself does not generate or host the data, but rather the content is obtained on the relay backend server 116, which normally has no direct connection to the external network. As httpd receives a request from the client 102, the request itself is proxied to one of the relay backend server 116, which then handles the request, generates the content from the receiver 124, and then sends this content back to httpd, which then generates the actual HTTP response back to the client 102. The reverse proxy includes load balancing functions of the load balancer 118.

The relay manager module 122 allocates incoming port numbers (ports 5000-5999) on web server 104 to the connection and invokes a new relay instance 128 to process the connection. The relay instance 128 receives the assigned port numbers and waits until both the client 102 and web server 104 have contacted the relay reverse proxy 132 to request connections. Requests from client 102 and web server 104 are received at relay backend system 116 and forwarded to the appropriate ports by load balancing features, the relay instance 128, or the like. Although connections may be established using TCP, UDP, or any other protocols, in various embodiments, the connections are originated by client 102 and web server 104 using TCP protocols to aid in traversing any firewalls 113 that may be intervening. Because most firewalls 113 do not block TCP connections that originate from within the trusted network, such connections can be very effective in establishing communications through the relay backend server 116.

In the example of FIG. 2, relay backend server 116 appropriately establishes a persistent connection with relay manager 122 prior to receiving client requests between the client 102 and the receiver 124. To that end, relay backend server 116 suitably places an outgoing request to the relay reverse proxy 132 that can be forwarded by relay instance 128 to the receiver 124. Request 202 may be triggered by the startup of the web server 104 (e.g., by firmware executing in web server 104), if desired. Since request 202 is an outgoing request, it will typically be allowed by the router in gateway 103, and any replies from web server 104 will typically also be allowed since they are replies to request that initiated from the internal network. These communications can be used to establish a persistent TCP or other connection that can be kept alive (e.g., using TCP "keepalive" packets) until the connection is needed.

Client 102 initially obtains an address on its local network and reports this address (along with any other appropriate address information) to the data storage server 120. In various embodiments, client 102 initiates contact with a router of a gateway to request an address and/or port number. The router returns the address information as appropriate. The address information returned may include an IP address on a local LAN (e.g., network 110). In various embodiments, client 102 also requests and receives a dedicated port number on the WAN interface of router of a gateway 103, thereby allowing communications directed to that port to be forwarded to client 102 on the internal network. This port number could, in turn, be part of the client's address information that is stored for future use by a web server 104 attempting to establish an incoming connection to the client 102.

In various embodiments, client 102 takes other actions to identify any other address information that can be obtained. Client 102 may perform a traceroute analysis to a known address or URL on the network, for example, to identify addresses and/or port numbers of other computing nodes that could relay messages to the client 102, or that could aid web server 104 in locating client device 102 on network 110. Other network information could be collected and stored by client device 102, as desired.

The client device 102 suitably reports any of its address information to data storage service 120, as appropriate. This report may be, for example, an XML or other formatted file that is placed with an appropriate web service using, for example, conventional HTTP "put" or "post" instructions sent to an appropriate URL on network 105. Address information may alternatively be sent using any other protocols or formats, as desired. Typically, the report will also include an identifier or other name of the client 102 to permit subsequent retrieval from database of the data storage service 120. Data storage service 120 suitably stores the received address information in the database for subsequent retrieval.

When the client 102 later attempts to connect with web server 104, it initiates the connection by sending a connection request message 210 to the relay backend server 116. Typically, relay backend server 116 operates at a preexisting and well-known address on network 105 that can be hardcoded into client 102, and/or that can be readily obtained by automatic or manual configuration of client 102, and/, or that can be retrieved using domain name services (DNS) or other address resolution functions available via network 110.

In an exemplary embodiment, the user navigates (Step 1) to a portal using a browser from the client 102 and attempts a connection to a (placshifting) receiver 124 (over LAN or relay connection modes. In the relay connection, the request is sent to the relay manager 122 to the receiver 124 to enable a response from the receiver 124 to the client 102.

If both the connection modes fail (attempting to connect via the LAN or a relay mode), then the user's request at the portal attempts a connection to receiver 124 using the relay reverse proxy service (Step 2). Client 102 connects to relay reverse Proxy service (NodeJS) that is configured in an exemplary embodiment for listening first on 9000 port through apache modproxy or for listening second on port 443 (Step 3). The relay reverse proxy service 132 acts as the endpoint for HTTPS handshake with Client device 102 (as opposed to the regular relay service, where the relay is just a routing module and HTTPS handshake is actually performed with the receiver 124 devices). In turn, the relay reverse proxy service 132 connects to a Relay Instance 128 running on the same node (i.e., NodeJS) over the regular port range of 5000-5750. In turn, the relay instance 128 connects (Step 5) to the receiver 124 on port ranges 5000-5999. The receiver 124 responds (Step 6) to the request from the relay instance 128 on ports 5000-5999. The relay instance 128 sends the response (step 7) to the relay reverse proxy service 132. The relay proxy service 132 acts like the endpoint (content provider) and sends (Step 8) the response to the standard port (i.e., port 443) via the network 110 to the client 102.

The request 202 is an outgoing message through the router of gateway 103, so the gateway will typically allow the outgoing message to proceed, and replies from relay manager 122 will also be allowed to return through the router of gateway 103. The message will typically contain a name or other digital identifier of the particular server that is desired by client 102, as appropriate.

To facilitate replies to the outgoing message, gateway 103 will typically allow incoming messages at a particular port number that is associated with the outgoing request. This port number will generally be associated with an address on the WAN side of the router so that messages sent to that address and port number will be forwarded by the requesting client device 102 on LAN (network 110). This address and port number may be used, in some implementations, by web server 104 to contact client device 102.

The relay manager 122 may acknowledge request 202 if desired. The message request 202 will typically identify the client device 102 that is requesting the connection by name or digital identifier so that web server 104 can request and obtain stored address information associated with that particular client 102.

Figure 3:
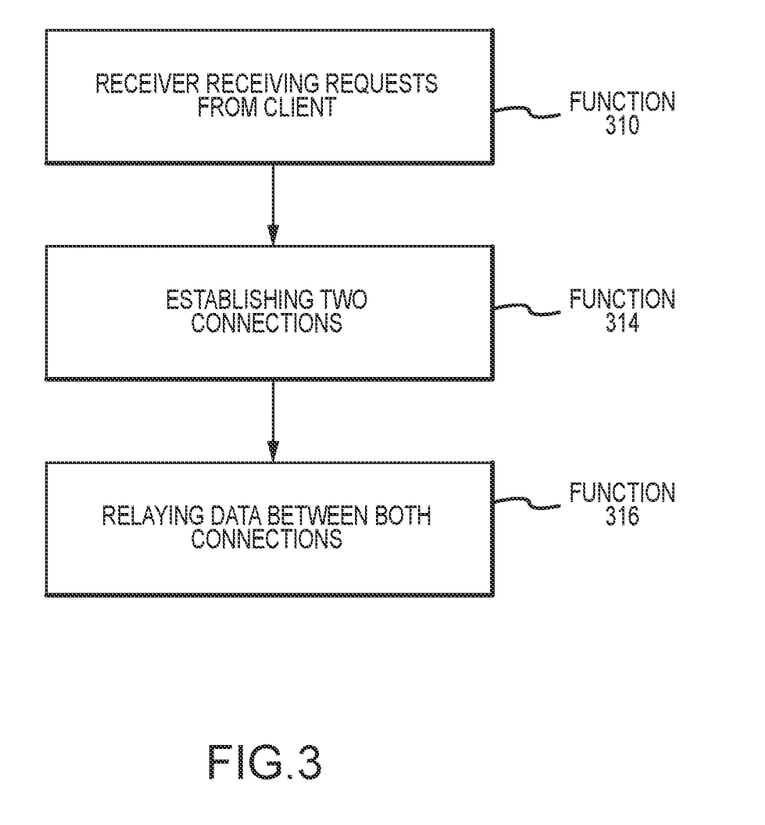
FIG. 3 is a flowchart of an exemplary process for establishing a relay connection between a client node and a server node.

FIG. 3 is an exemplary flowchart of the request from the client to the receiver using the reverse proxy service of FIGS. 1-2, in accordance with an embodiment.

Turning now to FIG. 3, an exemplary method 300 for establishing a connection between a client 102, a server 104, and a receiver 124 suitably includes the broad steps of receiving requests 202 from client 102 and server 104, respectively, at a relay backend server 116 (function 310); establishing the two connections of a connection between the client 102 and relay reverse proxy (D), and another connection between the receiver 124 and relay reverse proxy 132 using the relay instance 128 (function 314); and relaying data between the two connections using the relay reverse proxy 132 (function 316) to establish the reverse relay proxy service with the relay instance 128 connections (E, F). Other embodiments may provide additional features as well.

Various embodiments may allow server 104 to make several outgoing connections to various addresses and/or port numbers that are obtained from the data storage server 120, as desired.

Further embodiments could expand the concepts herein so that the server additionally or alternately stored its address and port information with a reverse proxy service on the network 110 so that the client could similarly initiate contact the receiver and receive streaming data from the receiver at the receivers last nonstandard port using the relay reverse proxy service with the server along with the receiver's last-known addresses. Put another way, although the figures and discussion generally describe the client as being located behind a firewall, equivalent concepts could be used to allow the receiver to use nonstandard ports to send data to client devices that are located behind firewalls as well.

The general concepts described herein could be expanded in any number of ways to address any number of different network connectivity issues relating to any types of client or server devices. Although the network environment is often described herein as a "home" environment, for example, equivalent concepts could be applied to offices, schools, factories, restaurants and bars, and/or any number of other environments that make use of multiple local area networks.

Moreover, the concepts described herein with respect to contacting DVR or PVR video storage devices to establish video streaming could be equivalently applied for other applications or purposes, such as internet television (IPTV), video gaming, home or office control, file or print sharing and/or any other applications as desired.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. On the contrary, various changes may be made in the function and arrangement of the various features described herein without departing from the scope of the claims and their legal equivalents.

What is claimed is:

1. A method, comprising:
establishing a first connection between a client and a relay reverse proxy running on a relay backend server using a first port, wherein the first port is a standard port accessible via a network;
establishing a second connection between the relay reverse proxy and a relay instance running on the relay backend server using a second port, wherein the second port is in a nonstandard port range, wherein the relay instance maintains a third connection between the relay instance and a network device via the network using a third port, wherein the third port is in the nonstandard port range, and wherein the network device is isolated from the relay backend server by a firewall;
receiving a request for streamed content from the client over the first connection by the relay reverse proxy;

forwarding the request from the relay reverse proxy to the relay instance via the second connection;
further forwarding the request from the relay instance to the network device via the third connection; and
relaying a response to the request received from the network device to the client via the third connection, the second connection, and the first connection, respectively.

2. The method of claim 1, wherein the network device is a placeshifting device.

3. The method of claim 1, wherein the relay reverse proxy monitors port 9000 for communications from the client.

4. The method of claim 1, wherein the nonstandard port range includes ports 5000 to 5999.

5. The method of claim 1, wherein the standard port is port 443.

6. The method of claim 1, wherein the relay reverse proxy is an endpoint for an HTTPS handshake with the client.

* * * * *